Oct. 9, 1962  D. J. FEMIANO  3,058,105
SIMPLE RADAR SYSTEM
Filed Nov. 7, 1957  2 Sheets-Sheet 1

INVENTOR.
DOMINIC J. FEMIANO
BY
ATTYS.

Oct. 9, 1962  D. J. FEMIANO  3,058,105
SIMPLE RADAR SYSTEM
Filed Nov. 7, 1957  2 Sheets-Sheet 2

*INVENTOR.*
DOMINIC J. FEMIANO

BY
ATTYS.

United States Patent Office 3,058,105
Patented Oct. 9, 1962

3,058,105
SIMPLE RADAR SYSTEM
Dominic J. Femiano, 905 Kearny St. NE.,
Washington, D.C.
Filed Nov. 7, 1957, Ser. No. 695,180
17 Claims. (Cl. 343—13)
(Granted under Title 35, U.S. Code (1952), sec. 266)

The invention described herein may be manufactured and used by or for the Government of the United States of America for governmental purposes without the payment of any royalties thereon or therefor.

This invention relates generally to a radar system and more particularly to a simple navigational radar system for detecting and indicating the distance to an object.

Although numerous radar systems employing the principle of determining object distance from the magnitude of the time interval between the transmission of an electromagnetic energy impulse toward an object and the reception of the obstacle reflected impulse have been heretofore devised, the majority of these radar systems have been found to be too complex in operation, massive and excessive in cost and maintenance expenses for use on small pleasure craft, or the like.

Accordingly, it is a principal object of the instant invention to provide a relatively inexpensive, facile, and accurate obstacle range indicator for a small craft navigational radar system.

Another object of the present invention is the provision of a new and improved radar system wherein the receiver is rendered insensitive to the echos of transmitted signals for progressively longer time periods.

A further object of this invention is the provision of new and improved circuit means for controlling the echo signal responsive intervals of a navigational radar system.

Other objects and many of the attendant advantages of this invention will be readily appreciated as the same becomes better understood by reference to the following detailed description when considered in connection with the accompanying drawings wherein.

Figure 1:
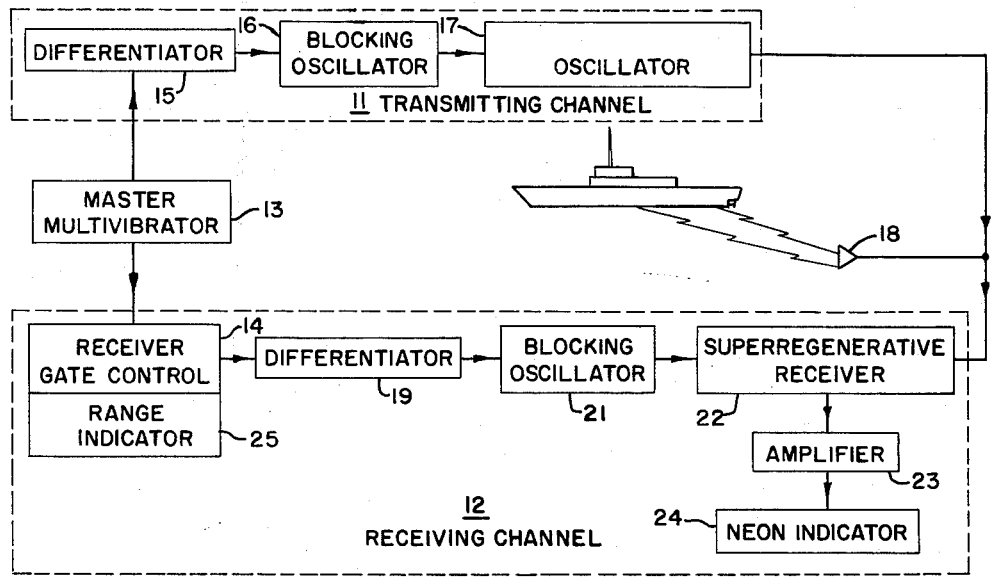
FIG. 1 illustrates in block diagrammatic form one embodiment of an overall radar system according to the present invention.

Referring now to the drawings wherein like reference numerals indicate like parts throughout the several views, and more particularly to FIG. 1 whereon the radar system is shown as including a transmitter channel 11, a receiving channel 12, and a conventional master multivibrator 13 for generating a series of substantially square wave control pulses. The control pulses of multivibrator 13 are concurrently applied to a gate control circuit 14 in the receiver channel 12, the purpose of which will be more fully described hereinafter, and to a conventional R-C differentiating network 15 in transmitting channel 11. The differentiating network is designed to have a small time constant characteristic in relation to the period of the generated square wave pulses and converts the sharp edges of the square wave pulses into peaked triggering impulses. The triggering impulses are transmitted to a conventional blocking oscillator 16 whereupon the oscillator is shock-excited into oscillation to produce a narrow output pulse for each triggering impulse applied thereto. The output pulse of the blocking oscillator is applied to a conventional oscillator 17 for modulating the radio frequency carrier signal generated therein, thereby resulting in the development of a narrow radar pulse for transmission by a suitable directional antenna 18 into the surrounding spatial region.

As described hereinbefore, the control pulses of multivibrator 13 are also applied to delay circuit 14 of receiving channel 12 wherein each pulse of a predetermined sequence of pulses is delayed for preselected successively longer time intervals before being applied to a conventional R-C differentiating network 19 which, like differentiator 15, has a relatively short time constant characteristic for converting the multivibrator square wave pulses into peaked triggering impulses. As in transmitting channel 11, the triggering impulses are fed to a conventional blocking oscillator 21. The narrow output initiating pulses developed by the blocking oscillator in response to the triggering impulses applied thereto is fed to a conventional super-regenerative receiver, or oscillator 22 normally insensitive to an echo signal, and actuable to be sensitive to an echo signal from a reflecting object for a preselected time interval upon application of the initiating pulse. If during the echo responsive period of super-regenerative receiver 22, an object reflected echo signal of the corresponding transmitted radar signal is intercepted by antenna 18, an output signal is developed by the receiver which is translated through a suitable amplifier 23 to a normally deenergized visual indicating device 24, such for example as a neon gas bulb. Upon the momentary energization of indicator 24 in response to object detection, the range of the detected object can be determined by observation of the reading indicated on a range scale, or indicator, 25 operationally controlled by the pulse delay circuit 14 of receiving channel 12, as will now be more completely described.

Figure 2:
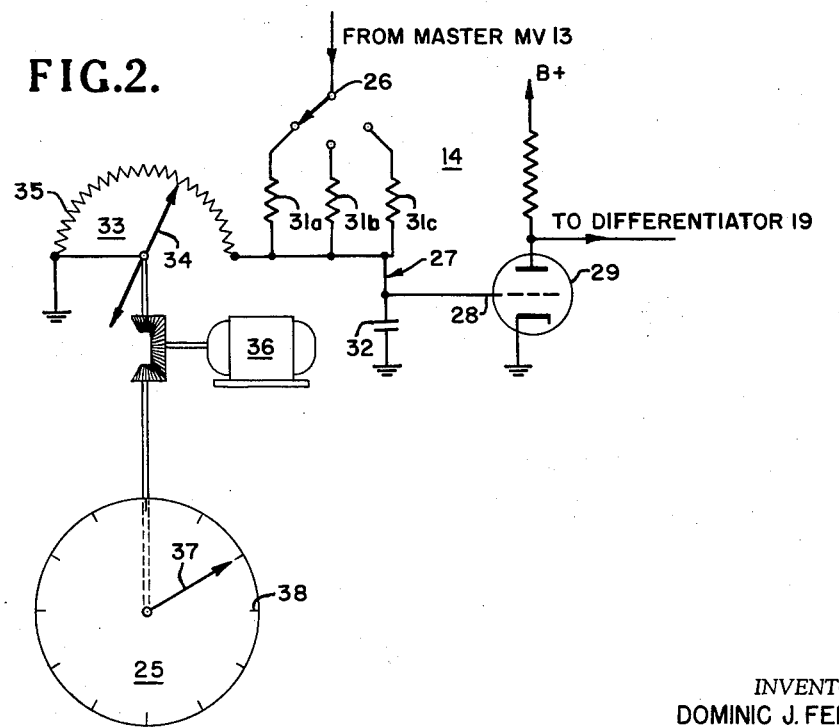
FIG. 2 is a detailed view of a portion of the system of FIG. 1.

Referring now to FIG. 2 of the drawings, a delay circuit generally indicated at 14 for effecting successively longer delay intervals between the echo signal responsive, or listening, period of super-regenerative receiver 22 and synchronous operation of range indicator 25 is illustrated in detail. As shown thereon, the substantially square wave pulses from the master multivibrator 13 are applied through a circuit selector switch 26 across a R-C network 27 to the control grid 28 of an electron tube 29. Electrical switch 26 functions as a range selector by feeding the multivibrator square wave signal through a selected one of divers magnitude resistors 31a, 31b and 31c of R-C network 27 thereby regulating the time interval required for the potential across capacitor 32 to build up to a level at which the normally cut-off electron tube 29 will be rendered conductive. In order to effect sequentially longer cut-off intervals of amplifier tube 29 within the scanning range selected by switch 26, a rheostat 33 is parallel coupled across capacitor 32 and the effective resistance thereof continually varied by rotation of wiper arm 34 over the stationary resistance element 35 of the rheostat by an electric motor 36. The instantaneous effective resistance of rheostat 33 will control the instantaneous potential available across capacitor 32 to render the vacuum tube 29 conductive thereby to translate a signal from the multivibrator 13 to differentiating network 19. In conjunction with rotation of the rheostat wiper arm 34, whereby the initiating signals translated to the super-regenerative receiver 22 are delayed for successively longer time periods, the motor also effects rotation of an indexing pointer 37 over a distance graduated dial 38 of range indicator 25. The pointer rotational rate is synchronous to the delay introduced into the initiating signal by potentiometer 33 of delay circuit 14. It is to be understood therefore that upon the impingement of an obstacle reflected signal upon antenna 18 during a receiver 22 echo signal responsive, or sensitive period, the distance to the signal reflecting obstacle will be accurately displayed by pointer 37 and calibrated dial 38 of range indicator 25 at the instant the indicator flashes.

It is to be understood that the calibrated dial 38 of the range indicator 25 may bear some manner of range markings thereon which will correspond to the three different ranges of time delays encountered because of the three different positions of the circuit selector switch 26. There are a variety of methods of calibration and range markings which may be employed depending on the desired use of the system and preferences of the operator. One of these methods would be to place three different range readings at each calibration mark around the scale. One of these sets of range readings would indicate the distances corresponding to the total time delay for both the corresponding setting of the selection switch 26 and the instantaneous position of the potentiometer pointer 34. Thus the operator will read three range indications, such as one mile, two miles and three miles, at one position of the pointer and need only choose the one reading which he knows to be related to the particular position of the circuit selector switch 26. An alternative method would be accomplished by marking the range scale with a single set of markings, such as the numbers zero to nine to represent the number of basic distance units corresponding to the total delay. For each setting of the circuit selector switch 26 this basic unit measurement would be different, such as 1,000 yards, 1 mile, and 10 miles. The basic unit would depend on the size of the resistances in each of the circuits made available by the selector switch. By these methods or any others which are well known, the range may be indicated by the indexing pointer 37 on the graduated dial 38.

Figure 3:
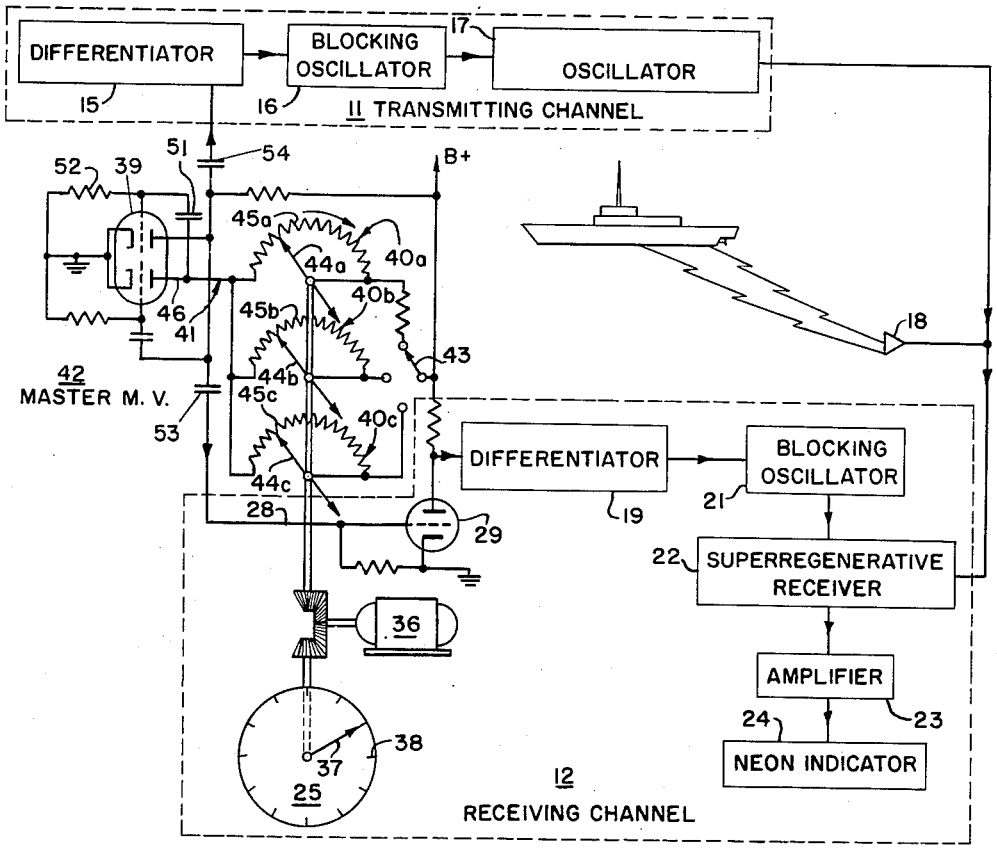
FIG. 3 is a block diagrammatic illustration of an alternative embodiment of the overall radar system according to the instant invention.
Figure 3:
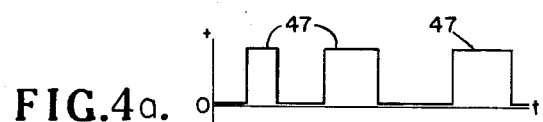

FIG. 3 shows an alternative embodiment of a radar system according to the present invention wherein the sequentially longer delay intervals between the echo signal response periods of the receiving channel 12 are effected by progressively increasing the duration period $d$ of the control pulses generated by the master multivibrator 39. To accomplish this, one of a plurality of divers magnitude motor driven rheostats 40a, 40b and 40c is placed in the plate circuit of stage 41 of the dual stage electron tube 39 of the master multivibrator 13 by the range selector switch 43. The variation of the effective resistance of the selected rheostat by the continual movement of wiper arms 44a, 44b and 44c over the respective stationary resistance elements 45a, 45b and 45c, respectively, by motor 36 will vary the operational characteristics of the corresponding stage 41 of electron tube 39, in a manner to sequentially prolong the duration period $d$ of the control pulses 47 generated by stage 41.

Figure 4A:
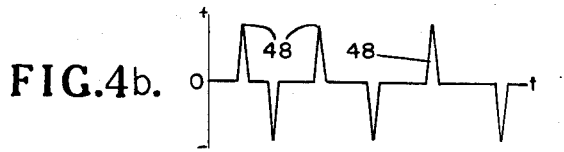
FIGS. 4a, 4b and 4c illustrate certain waveforms for facilitating an understanding of the operation of the system shown in FIG. 3.
Figure 4B:
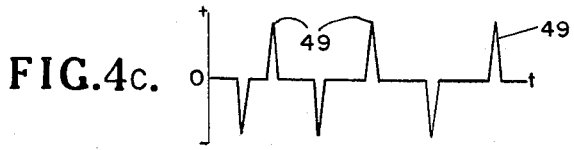
Figure 4C:

As in the radar system of FIG. 1, the control pulses 47 are concurrently applied to differentiator 15 of transmitting channel 11 and to phase inverting amplifier tube 29 and differentiator 19 of receiving channel 12 thereby developing differentiated signals 48 and 49 as illustrated in FIGS. 4b and 4c, respectively. The control pulses are applied by way of isolating capacitors 53, 54. It is understood that any conventional isolation means can be used in either the apparatus of FIG. 1 or FIG. 3. It should now be apparent that if the blocking oscillators 16 and 21 of transmitting channel 11 and receiving channel 12, respectively are each initiated upon the application of a positive triggering impulse thereto, radar pulses will be generated and transmitted while the echo signal response periods will be interrupted at sequentially longer time periods from the leading edge of the control pulses, as determined by the duration of the control pulses generated by the master multivibrator 42.

It is to be understood that although the duration period $d$ of the control pulses has been disclosed as being controlled by variation of the plate circuit resistance, it is also possible to accomplish this control by variation of the magnitude of the coupling capacitor 51 or resistor 52 in the master multivibrator 42. Moreover, although the receiver unit 12 has been described as being delayed for progressively longer time intervals, satisfactory results are obtainable when the receiver is initially delayed for a relatively long duration and the delay duration progressively diminished. It is to be understood that the range indicator 25 shown with this embodiment has calibrated markings on the dial 38 which have appropriate range readings marked thereon for each of the three positions of the range selector switch 43.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. Distance indicating apparatus comprising first circuit means for generating control pulses at discrete intervals, each of said pulses having a substantially sharp leading edge thereon, said first circuit means having a plurality of output terminals, second circuit means connected to one of said output terminals for developing a triggering impulse in response to each said sharp leading edge, third circuit means responsive to said triggering impulses for producing transmittable pulses, antenna means for radiating said transmittable pulses into space and for intercepting any obstacle reflected signal portion thereof, fourth circuit means connected directly to another of said output terminals for delaying said control pulses for successively longer delay periods, fifth circuit means for developing triggering impulses in response to the sharp leading edge of said delayed control pulses, sixth circuit means actuable for a preselected time interval in response to said triggering impulses developed by said fifth circuit means for developing an indicating signal upon said interception of an obstacle reflected signal only during said preselected time interval, said sixth circuit means being coupled to said antenna and said fifth circuit means, and indicator means regulated by said delaying circuit for directly indicating the range of the signal reflecting obstacle at the time of such indicating signal.

2. Distance indicating apparatus according to claim 1 wherein said first circuit means comprises a multivibrator.

3. Distance indicating apparatus according to claim 1 wherein said second circuit means includes a serially coupled differentiating network and blocking oscillator.

4. Distance indicating apparatus according to claim 1 wherein said third circuit means comprises an oscillator.

5. Distance indicating apparatus according to claim 1 wherein said fourth circuit means includes a normally nonconductive electron discharge device, a plurality of selectable resistance-capacitance networks coupled between said device, and said first circuit means, each of said networks rendering said electron discharge device conductive at divers delay intervals, and a motor driven variable resistor coupled to said electron discharge device and to said network for continually varying the delay interval of the selected resistance-capacitance network.

6. Distance indicating apparatus according to claim 1 wherein said fifth circuit means includes a serially coupled differentiating network and blocking oscillator.

7. Distance indicating apparatus according to claim 1 wherein said sixth circuit means includes a super-regenerative receiver and a neon indicator electrically coupled thereto.

8. Distance indicating apparatus according to claim 1 wherein said indicator means comprises a distance calibrated disc, and a motor driven indexing device rotatably traversing said disc.

9. A radar system comprising a multivibrator circuit for generating a sequence of substantially square wave pulses at substantially equal intervals; a first differentiating circuit coupled to said multivibrator for differentiating said pulses; a first blocking oscillator coupled to said first differentiating circuit for developing triggering impulses in response to said differentiated pulses; an oscillator coupled to said first blocking oscillator for developing radar energy signals in response to said triggering impulses; an antenna coupled to said oscillator for transmitting said radar pulses and for intercepting an object reflected portion of said radar signals; a delay circuit coupled to said multivibrator circuit including a normally nontranslating electron tube, a plurality of resistance-capacitance networks each having divers time constant characteristics coupled between said tube and said multivibrator for rendering said tube pulse translating at divers delay intervals, a network selector switch coupled to said multivibrator for applying said sequence of pulses to a selected one of said resistance-capacitance networks, said network including a motor driven variable resistor for continually prolonging the delay interval of said selected one of said resistance-capacitance networks; a second differentiating network coupled to said delay circuit for differentiating the delayed pulses translated therefrom, a second blocking oscillator coupled to said second differentiating network for developing triggering impulses in response to said differentiated pulses; a normally ineffective super-regenerative receiver circuit coupled to said second blocking oscillator, said receiver being rendered effective in response to said triggering impulses for developing an output signal in response to said intercepted radar energy signals, an indicator circuit coupled to said receiver for developing a visual signal in response to said output signal; and a range indicator including a range calibrated scale and an indexing pointer rotating across said scale at a synchronous rate with said motor driven variable resistor whereby the indexing pointer indicates the range to said object at the time of said visual signal.

10. A radar system comprising a control pulse source for generating a sequence of control pulses, a transmitting means for producing and radiating a narrow pulse of electromagnetic energy signals only in response to a first triggering pulse, a receiving means for receiving reflections of said electromagnetic energy signals from an object, said receiving means being operative only in response to a second triggering pulse, a first triggering pulse producing means connected in series circuit between said control pulse source and said transmitting means to produce said first trigger pulse in time coincidence with the leading edge of said control pulses, continuously variable delay means operably connected to said control pulse source for progressively delaying the trailing edge of said control pulses with respect to said first trigger pulse, a second triggering pulse producing means connected in series circuit between said delay means and said receiving means to produce said second triggering pulses in time coincidence with the delayed trailing edge, an indicator connected to said receiving means to indicate the reception of reflected signals by said receiving means, and a range scale indicator connected to and regulated by said delay means for indicating the distance to a reflecting object when said indicator is actuated.

11. Distance indicating apparatus comprising a pulse generating means for generating a series of control pulses, each of said control pulses having a progressively longer duration period, transmitting means operably connected to said pulse generating means for producing and radiating a narrow pulse of electromagnetic energy signals only in response to the leading edge of said control pulses, a receiving means operably connected to said pulse generating means for receiving reflections of said electromagnetic energy signals from an object, said receiving means being operative for a short period only in response to the trailing edge of said control pulse, control means for progressively prolonging the said duration period, and indicating means connected to and regulated by said control means for indicating the distance to said object when said reflections are received by said receiving means.

12. The apparatus of claim 11 in which said transmitting means comprises an antenna, an oscillator connected to and supplying radar energy oscillations to said antenna and a triggering pulse means connected between said pulse generating means and said oscillator to develop a short duration triggering pulse in coincidence with said leading edge of said control pulses.

13. The apparatus of claim 12 in which said triggering pulse means comprises a differentiator connected to said pulse generating means and a blocking oscillator responsive to the differentiation of said leading edge and connected to the output of said differentiator.

14. The apparatus of claim 11 in which the receiving means comprises a superheterodyne receiver connected to an antenna, a triggering pulse means connected between said pulse generating means and said oscillator to develop a short duration triggering pulse in coincidence with said trailing edge of said control pulses.

15. The apparatus of claim 14 in which said triggering pulse means comprises a differentiator connected to said pulse generating means, and a blocking oscillator responsive to the differentiation of said trailing edge and connected to the output of said differentiator.

16. The apparatus of claim 11 in which said pulse generating means is a multivibrator circuit, and said control means is motor driven to continuously vary the time constant of one half of the multivibrator.

17. Apparatus of claim 16 in which said indicating means comprises a range scale and indexing pointer, said pointer moving in synchronism with said motor driven means, said receiving means having therein a visual indicator to indicate when said reflections are being received, whereby the range is indicated by said pointer on said scale at the instant said visual indicator indicates reception of said reflections.

References Cited in the file of this patent

UNITED STATES PATENTS

| | | |
|---|---|---|
| 1,924,174 | Wolf | Aug. 29, 1933 |
| 2,407,198 | Wolff | Sept. 3, 1946 |
| 2,419,541 | De Rosa | Apr. 29, 1947 |